United States Patent Office 3,531,734
Patented Sept. 29, 1970

3,531,734
ION LASER HAVING METAL CYLINDERS TO CONFINE THE DISCHARGE
Eugene I. Gordon, Convent Station, and Edward F. Labuda, Madison, N.J., assignors to Bell Telephone Laboratories, Incorporated, New York, N.Y., a corporation of New York
Filed Mar. 15, 1965, Ser. No. 439,657
Int. Cl. H01s 3/02
U.S. Cl. 331—94.5     2 Claims This invention relates to gas discharge devices, and more particularly, to a species of laser known as the ion laser.

The laser, also known as the optical laser, is a relatively recent development of far-reaching technological importance because of its ability to amplify light and to generate coherent oscillations at light frequencies. By a mechanism of selective excitation known as pumping, an abnormally high proportion of high energy states are produced within an active medium of the laser, establishing a condition known as population inversion. As particles in the high energy states decay to lower energy states, radiation is emitted in a small frequency range centered about a characteristic frequency. It is possible to stimulate the emission of this radiation at the characteristic frequency for amplifying light or for the purpose of generating coherent light.

In the most familiar type of gas laser, the higher energy states involved in the population inversion of the laser are associated with excited states of neutral component atoms of a gas plasma which serves as the active medium. These atoms are excited by establishing a gas discharge in the gas medium. The pumping results from collisions of the discharge electrons with the neutral unexcited atoms. The gas discharge may be maintained by applying a radio frequency electric field, or, more typically, by a direct current between a cathode and an anode as in conventional gas discharge tubes. In either case, the gas discharge region is normally defined by an extended tubulation, the axis of which is coincident with the light beam to be generated or amplified. The desired laser action results from coherent radiation at a specific frequency by a large number of excited neutral atoms as they decay to a lower energy state. In a laser amplifier the net decibel gain is normally proportional to the total length of the gas plasma through which the incident light wave propagates. In a laser oscillator the available output power is proportional to the total plasma length through which the resultant light propagates.

New forms of gas lasers, now generally known as ion lasers, are described in the publications, "Visible Laser Transitions in $H_g^+$" by W. E. Bell, "Applied Physics Letters," vol. 4, No. 2, p. 34, Jan. 15, 1964, and "Laser Oscillation in Singly Ionized Argon in the Visible Spectrum," by William B. Bridges, "Applied Physics Letters," vol. 4, No. 7, p. 128, Apr. 1, 1964. Ion lasers use a much higher direct electrical current through the gas plasma than do conventional gas lasers. In the ion laser, ions of the gas plasma, rather than neutral gas atoms, are excited to a condition of population inversion. The ion laser has been found to be capable of generating significantly higher output power and is capable of much higher gain than conventional gas lasers.

The ion lasers described above are operated as pulsed devices. As is taught in our copending application, Ser. No. 385,159, filed July 27, 1964, and assigned to Bell Telephone Laboratories, Incorporated, an ion laser can be operated continuously with a substantially constant output power provided a gas return path is included for equalizing gas pressure throughout the tube.

The output power of an ion laser generally increases very rapidly as a function of current density within the gas discharge. A major limitation on the available output power of continuously operated ion lasers now appears to be the heat which results from high current density discharges. The tubular envelope which defines the gas discharge path is usually made of quartz which has a melting point of about 1700 degrees Kelvin. Even if the envelope is cooled by a water jacket or some other means, the temperatures generated by the gas discharge usually cannot exceed the melting point of quartz. Even more importantly at high current densities the quartz envelope tends to decompose and to release contaminants as a result of intense electron and ion bombardment. These contaminants may impair operation of the device by interfering with the discharge and the laser pumping mechanism. High melting point non-metallic materials such as ceramic cannot be used in the envelope because they are for the most part even more contaminating than quartz.

It is an object of this invention to cool efficiently gas discharge devices.

It is a specific object of this invention to increase the gain and attainable output power of ion lasers.

These and other objects of the invention are attained in an ion laser of the general type described above. A linear gas discharge path is defined between enclosures containing the cathode and the anode. A significantly higher continuous electrical current is transmitted through the discharge region than is true of conventional gas lasers. This high current is capable of exciting an appropriate population inversion of the component ions which results in the stimulated emission of light radiation. The cumulative coherent radiation of the ions at a specific frequency results in the generation of a coherent light beam along the linear path. If the device is to be used as an amplifier, a light beam of that predetermined frequency to be amplified is directed along the linear path.

In accordance with the invention, the linear discharge path is defined by a succession of hollow metal cylinders having central bores which determine the diameter of the discharge region. The cylinders may be made of any of a number of stable metals which have a fairly high melting point, such as molybdenum. Surrounding the metal cylinders is an insulative envelope such as quartz for containing the gas which forms the discharge. Because the envelope is removed from the gas discharge path, it is not subjected to either high temperatures or particle bombardment and therefore does not limit the current density that can be used within the discharge region.

In accordance with one embodiment of the invention, a metal disk is attached to each cylinder and extends through the envelope into a cooling jacket which contains an appropriate cooling medium such as water or air. The metal cylinders and metal disks constitute efficient thermal conductors for transmitting heat from the gas discharge to the cooling jacket. The disks also restrict the gas discharge to the axial region defined by the central bores of the cylinders.

To the best of our knowledge, metal elements, which are thermally and electrically conductive, have not been used in the past for defining a gas discharge region because it has been generally believed that a constant voltage gradient is required for a stable discharge; a voltage gradient cannot, of course, be maintained along a conductive surface. We have found that a substantially constant voltage gradient is required only along the central axis of a linear discharge region. We have further found that the succession of conductive cylinders will not interfere with a constant axial voltage gradient provided that the cylinders are not unreasonably long. The bore diameters of the cylinders determine the attainable current density of the discharge and are ascertained by known ion laser design techniques. The limitations on the lengths of the cylinders, which will be explained more fully later, are not, as a practical matter, very stringent because the axial cylinder lengths can be made arbitrarily small by simply increasing their number.

The successive metal disks which are connected to the cylinders effectively divide the gas contained within the envelope into a succession of segmented volumes. In accordance with another feature, each disk contains a small aperture which interconnects two adjacent volume segments. These apertures constitute a return path for the gas contained within the envelope and thereby equalize gas pressure along the discharge device. In accordance with the principles of our previously mentioned patent application, each aperture has a larger diameter than the bore diameters of the cylinders, and they are staggered so that each aperture is oriented at some angle preferably at 180 degrees, with respect to the preceding aperture. The return path for the gases is therefore a tortuous path of good gas transmissibility as is required for efficient gas pressure equalization. It is also of considerably longer length than the linear discharge path which necessarily restricts the discharge to the linear path.

In another embodiment of the invention, the metal disks are contained entirely within the envelope; they cool the cylinders by radiation. Since the cylinders are made of metal they can be heated to quite high temperatures without melting. This heat can, in many cases, be efficiently radiated by the relatively large area disks because radiant power increases drastically with temperature. Rather than having apertures, the disks may have small slots at their outer peripheries which are staggered to give a tortuous gas return path. The disks are preferably supported by elongated insulative support rods.

In accordance with another feature, the part of each disk which is bonded to the cylinder is bent in an axial direction to form a small frusto-conical portion. All of the frusto-conical portions extend in the same axial direction. This provision is made in order to maintain the relative spacings between successive cylinders under conditions of rather severe thermal stress. Thermal expansion and contraction of the disks may cause the cylinders to move slightly in an axial direction. With identical frusto-conical portions on all of the disks which extend in the same axial direction, the axial movements of the cylinders will be identical and their spacings will thereby be maintained.

These and other objects and features of our invention will be more fully appreciated from a consideration of the following detailed description, taken in conjunction with the accompanying drawing in which.

Figure 1:
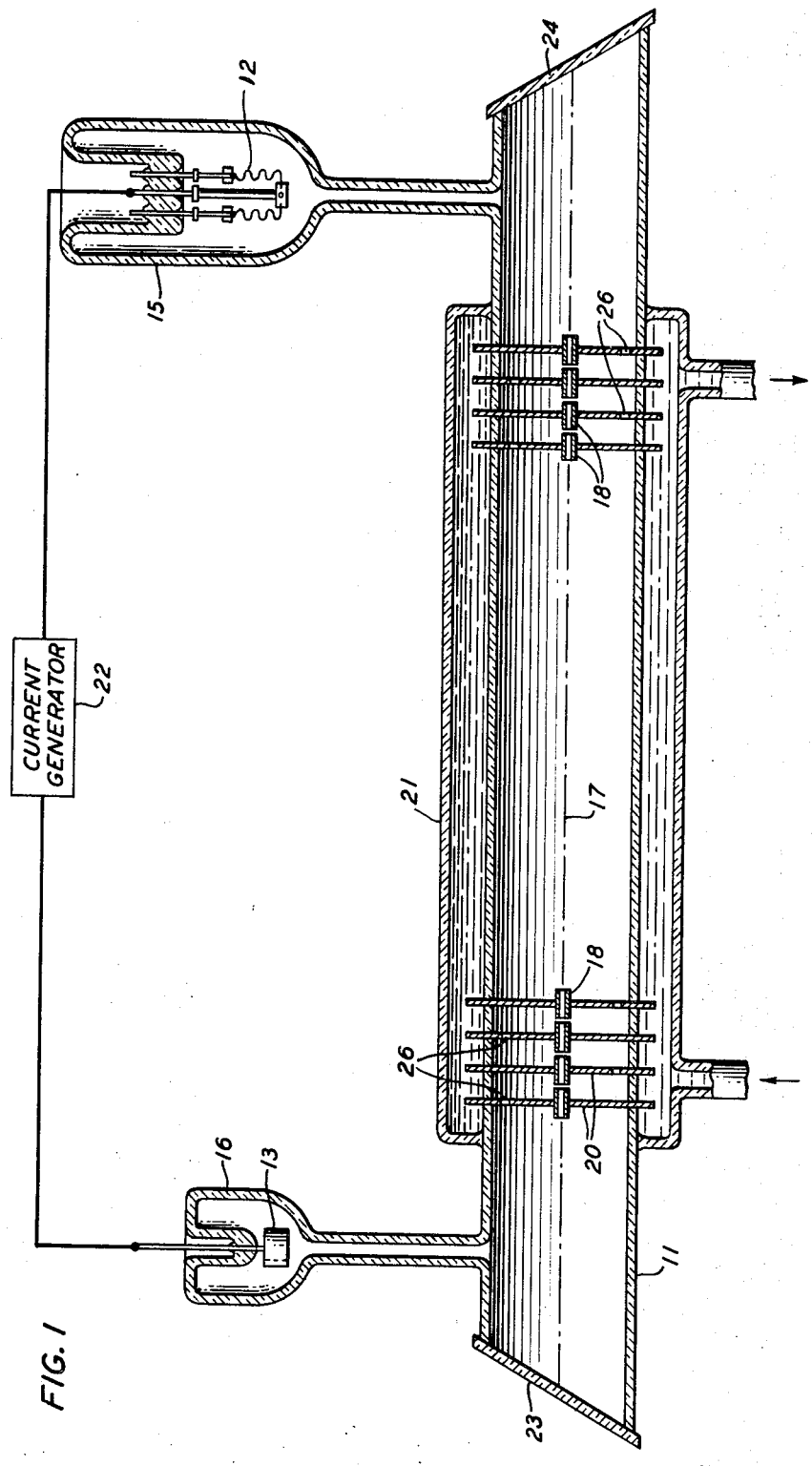
FIG. 1 is a sectional view of one embodiment of the invention.

Referring now to FIG. 1 there is shown a direct-current excited continuously operable ion laser comprising a tubular envelope 11 for containing a gas. A cathode 12 and an anode 13 are contained within enclosures 15 and 16, respectively, which are attached to and communicate with the tubular envelope. The device is filled with an appropriate gas which is suitable for population inversion of component ions when a gas discharge is maintained therethrough. Such a gas may, for example, be argon at a pressure of .45 millimeter of mercury. Other noble gases can alternatively be used, as is known in the art.

The linear gas discharge path is defined along a central axis 17 by a succession of axially extending hollow cylinders 18. The cylinders 18 are made of a metal such as molybdenum which has a high thermal conductivity and a fairly high melting point. Each of the hollow cylinders 18 is bonded to the inner periphery of an annular conductive disk 20, which supports the cylinder axially within the envelope 11. The disks 20 also effectively segment the volume within the envelope and thereby restrict the gas discharge to the linear region along central axis 17. It is to be noted that each cylinder is electrically insulated by the small axial spacings and by the envelope 11 to which the disks are mounted. The drawing is intended to show a continuous array, but, while highest gain is achieved by an extended and continuous path within the cylinders, neither the continuity nor a specific array length are crucial to the invention.

Conductive cylinders have not, to our knowledge, been used in the past for defining a gas discharge region because a voltage gradient cannot be established along a conductive surface. We have found, however, that for maintaining a discharge through the central bores of cylinders 18, it is only necessary to maintain a fairly constant voltage gradient along the central axis 17; this can be accomplished if the axial length of each cylinder is not unreasonably long with respect to their diameters. We have further found that the axial length of each cylinder is more strictly limited by the formation of a positive ion sheath along the inner surface of each cylinder after the discharge has been established. This sheath results from a negative charge which is imposed on each cylinder after the discharge is commenced. The negative charge attracts positive ions to the area adjacent the inner surface of the bore. It is believed that the thickness of the ion sheath increases with distance from the cathode or negative end of each cylinder to the anode or positive end. If this ion sheath thickness becomes appreciable with respect to the total bore diameter it will interfere with the discharge because there will no longer be a region of stable neutral plasma. The ratio of cylinder length to bore diameter that can be used is therefore limited.

In our illustrative embodiment, the cylinders 18 each have an axial length of .2 inch and a central bore diameter of .04 inch. This has been found experimentally to give a sufficiently small ratio between cylinder length and bore diameter to maintain a stable discharge. Of course, even smaller ratios can be used although little advantage is gained. It has been found experimentally that with a bore diameter of .04 inch, the ratio of cylinder length to bore diameter should not exceed 50:1. Analysis indicates that with larger bore diameters the limiting ratio of cylinder length to the bore diameter increases. In any case, this is not a very stringent limitation because in any practical embodiment the ratio can be made arbitrarily small by using a large multiplicity of cylinders for forming a linear path of any desired length.

For most efficient operation, the axial separation between successive cylinders should be small enough to keep the discharge confined to the cylindrical volume defined by the central bores; that is, the discharge should not fringe substantially out into the segmented volumes between the disks 20. This is because laser gain decreases drastically as the discharge diameter increases. In the absence of any other remedial modification, the separation distance should not ordinarily exceed the bore diameter in order to maintain a constricted discharge. In FIG. 1 the separation distance between successive cylinders is .020 inch. The envelope 11 should be sufficiently removed from the central axis 17 so that it is not subjected to intense heat. Our envelope 11 is cylindrical in shape with an inside diameter of 3 inches.

The disks 20 extend through the envelope 11 into a cooling jacket 21 which surrounds a major portion of the envelope. A cooling medium such as water or air is transmitted through the jacket 21 to remove heat from the disks 20. Because the cylinders 18 and disks 20 are made of conductive metal, they transmit heat very efficiently from the discharge region to the cooling jacket. Of course, the use of a large multiplicity of disks 20 increases effective thermal conductivity from the discharge region. For these reasons, relatively large current densities which would normally result in very high temperatures can be formed along the linear discharge path as is required for high gain and high power output.

Perhaps the most significant advantage of our device is that metal cylinders do not characteristically release gases or other contaminants as a result of sustained electron and ion bombardment. Conventional insulative envelopes such as quartz decompose and release contaminants when subjected to the intense particle bombardments which are an unavoidable concomitant of high current densities. At worst, metals will sputter rather than decompose, and consequently will not contaminate the discharge. Even substantial sputtering will not necessarily significantly damage the cylinders because the sputtered material is re-deposited on the cylinders. The envelope 11 of FIG. 1 is, of course, far enough removed from the discharge to protect it from particle bombardment as well as intense heat.

During operation, a relatively high current is generated by a current generator 22 which is transmitted along the gas discharge path from the cathode 12, along central axis 17, to the anode 13. This high current, which may, for example, be on the order of 10–50 amperes, causes a substantial part of the gas molecules or atoms within the device to become ionized. Additionally, the ions are excited to a condition of population inversion which is characterized by the existence of an abnormally high proportion of ions in a high unstable energy state. As these ions decay to lower, more stable energy states, they radiate light energy at a characteristic frequency in accordance with known laser phenomena. As is known in the art, high frequency electric fields can alternatively be used for exciting the gas discharge, in which case the anode and cathode can be eliminated.

Forming opposite ends of the tubular envelope 11 are light transparent windows 23 and 24 which are tilted at a proper "Brewster Angle" for maximizing transmission efficiency. When the device is used as an amplifier, light waves are admitted to the device through either of the windows and become amplified through the additive effect of stimulated emission from the excited gas ions. Mirrors may be placed on opposite sides of the device along the central axis in a known manner for multiplying the amplification or feeding back a sufficient portion of the energy to permit the device to operate as an oscillator. The mirrors also may be substituted for the windows in an internal mirror configuration.

As was taught in our previously mentioned copending application, continuous operation of an ion laser with comparatively constant high power output requires some provision for gas pressure equalization throughout the device. Our copending application shows a helical tubulation between the cathode and anode enclosures for giving a high transmissibility gas return path to compensate for gas migration which occurs within the discharge path. Within the device of FIG. 1, a gas return path is provided by apertures 26 in the conductive disks 20. The successive apertures 26 are staggered; that is, each aperture is located circumferentially at 180 degrees with respect to the preceding aperture. These successive apertures therefore define a zig-zag or serpentine return path for gas from the cathode to the anode. The diameters of the apertures are larger than the bore diameters of the cylinders 18 so that the gas return path is of longer length and of somewhat higher gas transmissibility than the path through the linear discharge region along the central axis 17. As was taught in our previous application, the longer length precludes a discharge through the return path, while the higher transmissibility of the return path, assures an effective gas pressure equalization. It can be appreciated that the gas return path of the device of FIG. 1 does not contribute materially to the complexity or fragility of the device, and is therefore advantageous for many purposes over the prior helical tubulation gas return path. There is nothing in the present invention, however, which precludes the use of the prior helical tubulation gas return path instead of the apertures described above.

Figure 2:
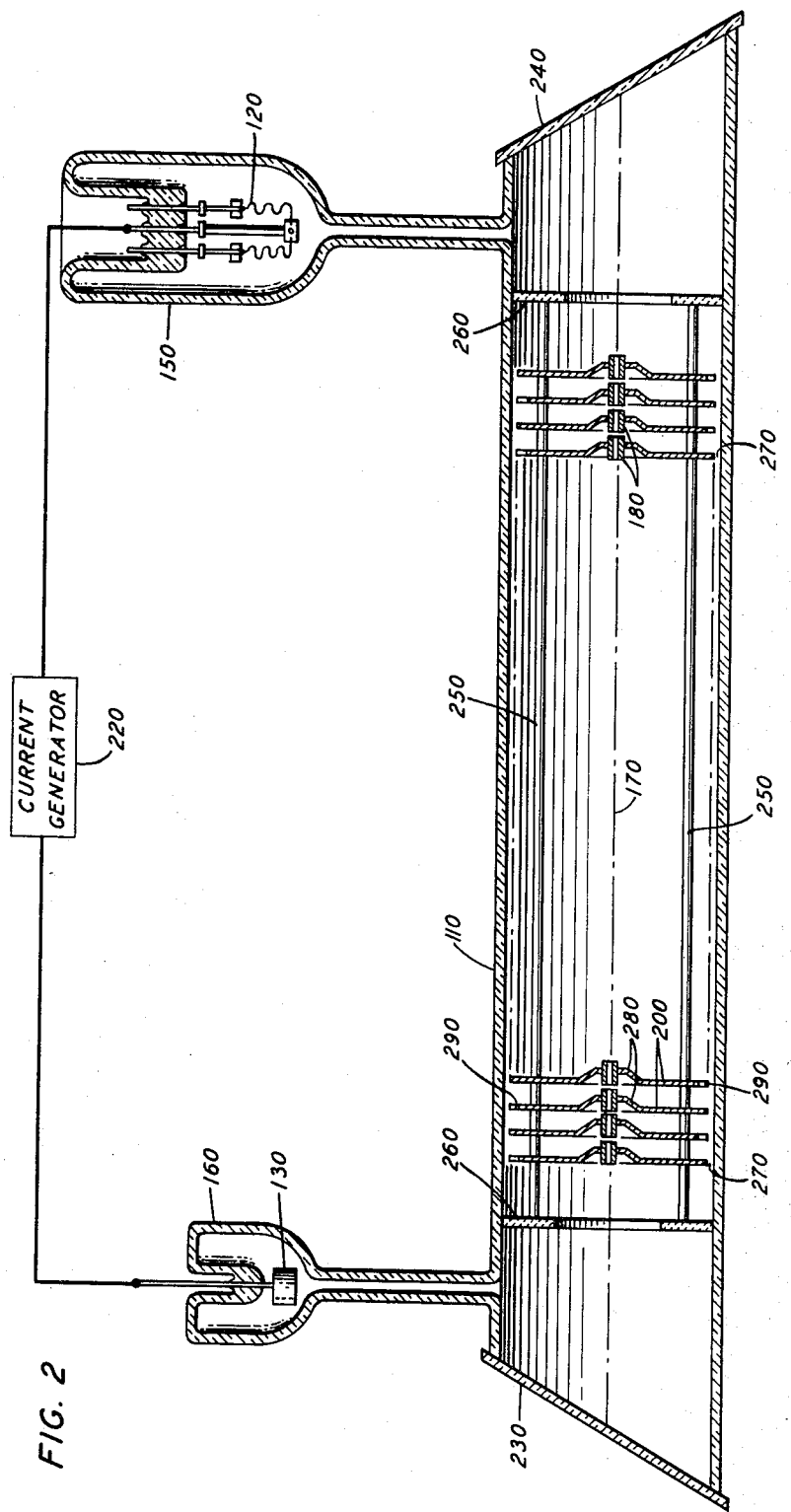
FIG. 2 is a sectional view of another embodiment of the invention.

Referring now to FIG. 2 there is shown another embodiment of the invention which operates according to the same principles as the embodiment of FIG. 1. Accordingly, the structural elements of FIG. 2 are indicated with reference numerals that are multiples of 10 of the corresponding elements of FIG. 1. Rather than being cooled by a cooling jacket, the cylinders 180 of FIG. 2 are cooled by radiation from the disks 200. Radiation is a practical method of cooling the conductive cylinders 180 for two reasons: the cylinders and disks are capable of withstanding very high temperatures because they are made of metal such as molybdenum; since the quantity of heat power which can be radiated is proportional to temperature to the fourth power, a great deal of heat can be radiated by the disks 200 at high temperatures. It can be shown that each disk is capable of radiating heat power P in accordance with the relation $$P = \sigma A T^4 \quad (1)$$

where $\sigma$ is a constant, A is the area of the disk and T is the temperature of the disk. In an array of disks such as shown in FIG. 2, it can further be shown that the total effective radiating area of the array is given by the product of the circumference and the axial length of the array. It can therefore be appreciated that at high temperatures the relatively large area disks 200 are very effective heat radiators.

The disks 200 are supported within the envelope by support rods 250 which may be made of an insulative material such as ceramic. Three support rods located 120 degrees apart with respect to the central axis may be used. The support rods are in turn supported by annular support wafers 260. The inside diameters of the support wafers 260 are large enough so that the discharge path may extend therethrough without subjecting them to substantial heating or electron and ion bombardment.

The high temperatures generated within the device impose thermal stresses on the disks 200 and cause them to expand and contract. Accordingly, a small gap 270 is preferably provided between each of the disks 200 and the tubular envelope 110. The gaps 270 should be small enough to prevent the formation of any gas discharge therethrough.

In the absence of any modification the thermal stresses on the disks might cause the various cylinders 180 to move slightly in different axial directions. In order to maintain the relative axial spacings of the cylinders 180, each disk is provided with a frusto-conical portion 280 which is bonded to the cylinder 180. All of the disks 200 are identical and all of the frusto-conical portions 280 extend in the same axial direction. Hence, upon thermal expansion or contraction of the disks, all the cylinders 180 move slightly in the same axial direction, and their relative axial spacings are maintained. This feature could of course also be used in the device of FIG. 1.

A gas return path for gas pressure equalization is provided by including a slot 290 in the outer periphery of each disk 200. Each slot 290 is located at 180 degrees with respect to adjacent slot so that a tortuous gas return path is established. Alternatively, apertures may be included in the disks for establishing a gas return path as in the device of FIG. 1.

In summary, it can be appreciated that our inventive concepts permit the establishment of extremely high current density and high temperature gas discharges. Such discharges are particularly useful in continuously operated ion lasers for producing high power output and high laser gain. The invention could, however, be used in other gas discharge devices in which high current densities or efficient cooling are desired. Further, the gas return path we have described does not contribute to the fragility of the device, as is true in prior devices. Various other modifications and embodiments may be made by those skilled in the art without departing from the spirit and scope of the invention.

What is claimed is:

1. An ion laser comprising:
   means comprising an envelope for confining a quantity of gas which is capable of population inversion in an ionized condition;
   means for establishing a gas discharge through said gas;
   means for maintaining a sufficiently high current flow through said gas to ionize a significant portion of said gas and to establish a population inversion of component ions, thereby initiating the stimulated emission of coherent optical radiation from at least part of the component ions of said gas;
   means for constraining the gas discharge to follow a linear path portion comprising an array of flat electrically and thermally conduction members each having a central aperture and being successively and axially arranged along the path portion;
   each of said members extending substantially to the inner surface of the envelope, thereby segmenting the volume within the envelope;
   and each of the members including an opening which interconnects the two adjacent volume segments which are separated by the member;
   the openings in successive members being located at different angular positions with respect to the linear paths, whereby successive openings describe a tortuous gas path for equalizing gas pressure within the envelope.

2. An ion laser comprising:
   means comprising an envelope for confining a quantity of gas which is capable of population inversion in an ionized condition;
   means for establishing a gas discharge through said gas;
   means for maintaining a sufficiently high current flow through said gas to ionize a significant portion of said gas and to establish a population inversion of component ions, thereby initiating the stimulated emission of coherent optical radiation from at least part of the component ions of said gas;
   means for constraining the gas discharge to follow a linear path portion comprising an array of flat metal members each having a central aperture and being successively and axially arranged along the path portion;
   at least part of each of the members substantially defining a frustum of a cone;
   and all of the frusto-conical member portions being substantially identical and extending in the same axial direction, whereby the same thermal expansion or contraction causes all of the flat members to move in the same axial direction and thereby maintain their relative axial spacings.

References Cited

UNITED STATES PATENTS

| | | | |
|---|---|---|---|
| 3,394,320 | 7/1968 | Medicus | 331—94.5 |
| 3,395,364 | 7/1968 | Bridges | 331—94.5 |
| 2,770,755 | 11/1956 | Good | 313—63 X |
| 2,867,748 | 1/1959 | Van Atta et al. | 313—63 X |
| 3,355,614 | 11/1967 | Geiger et al. | 313—63 |
| 3,172,057 | 3/1965 | Bennett | 331—94.5 |
| 3,363,196 | 1/1968 | Eknayan | 331—94.5 |

OTHER REFERENCES

Maecker: F. Naturforschg., vol. 11A, pp. 457-9 plus partial translation, 1956.

Varlamov: Sov. Phys.-Tech. Phys., vol. 9, pp. 795-7, December, 1964.

Maecker: F. Physik, vol. 158, pp. 392-404 plus partial translation, 1960.

Gordon et al.: App. Phys. Lett., vol. 4, pp. 178-80, May, 1964.

Basov et al.: Optas & Spect., vol. 15, pp. 235-6, September, 1963.

Rizden: IEEE, J. Quant. Elect., vol QE-1, pp. 221, August, 1965.

Smith: "Optical Maser Action," Journal of Applied Physics, vol. 33, March, 1964, pp. 723-724.

RONALD L. WIBERT, Primary Examiner

E. BAUER, Assistant Examiner

U.S. Cl. X.R.

313—204